(12) United States Patent
Tehranipoor et al.

(10) Patent No.: US 9,071,428 B2
(45) Date of Patent: Jun. 30, 2015

(54) METHODS AND SYSTEMS FOR HARDWARE PIRACY PREVENTION

(71) Applicant: University of Connecticut, Farmington, CT (US)

(72) Inventors: Mohammad Tehranipoor, Mansfield, CT (US); Nicholas Tuzzio, Storrs, CT (US)

(73) Assignee: University of Connecticut, Farmington, CT (US)

( * ) Notice: Subject to any disclaimer, the term of this patent is extended or adjusted under 35 U.S.C. 154(b) by 0 days.

(21) Appl. No.: 14/217,311

(22) Filed: Mar. 17, 2014

(65) Prior Publication Data

US 2014/0340112 A1 Nov. 20, 2014

Related U.S. Application Data

(60) Provisional application No. 61/798,648, filed on Mar. 15, 2013.

(51) Int. Cl.
*H04L 9/08* (2006.01)
*H03K 19/177* (2006.01)
*G09C 1/00* (2006.01)

(52) U.S. Cl.
CPC ........ *H04L 9/0869* (2013.01); *H03K 19/17768* (2013.01); *G09C 1/00* (2013.01); *H04L 9/0866* (2013.01); *H04L 2209/12* (2013.01)

(58) Field of Classification Search
None
See application file for complete search history.

(56) References Cited

U.S. PATENT DOCUMENTS

| | | | | |
|---|---|---|---|---|
| 4,218,738 A | * | 8/1980 | Matyas et al. | 705/72 |
| 4,386,234 A | * | 5/1983 | Ehrsam et al. | 380/281 |
| 2006/0271792 A1 | * | 11/2006 | Devadas et al. | 713/189 |
| 2012/0221860 A1 | * | 8/2012 | Hoornaert et al. | 713/172 |

OTHER PUBLICATIONS

Alkabani, Y.M., et al. "Active hardware metering for intellectual property protection and security," in proc. 16th USENIX Security Symposium, 20:1-20:16 (2007).
Alorda, B., et al. "A non-intrusive built-in sensor for transient current testing of digital VLSI circuits," in proc. 11th IEEE Internation On-Line Testing Symposium (IOLTS '05), 172-182 (2005).
Baumgarten, A., et al. "Preventing IC Piracy Using Reconfigurable Logic Barriers," *IEEE Design Test of Computers*, 27(1): 65-75 (2010).
Bushnell, M., et al. *Essentials of Electronic Testing for Digital, Memory, and Mixed-signal VLSI Circuits*, Kluwer Academic, (2000).
Chatterjee, K., et al. "Semiconductor Manufacturers' Efforts to Improve Trust in the Electronic Part Supply Chain," *IEEE Transactions on Components and Packaging Technologies*, 30(3): 547-549 (2007).
Datta, R., et al. "On-chip delay measurement for silicon debug," in proc. 14th ACM Great Lakes Symposium on VLSI (GLSVLSI '04), 145-148 (2004).

(Continued)

*Primary Examiner* — Crystal L Hammond
(74) *Attorney, Agent, or Firm* — Ballard Spahr, LLP

(57) ABSTRACT

Provided are methods, systems, and devices for preventing hardware piracy.

20 Claims, 10 Drawing Sheets

(56) References Cited

OTHER PUBLICATIONS

"Defense Industrial Base Assessment: Counterfeit Electronics", http://www.bis.doc.gov/index.php/forms-documents/doc_view/37-defense-industrial-base-assessment-of-counterfeit-electronics-2010.pdf, U.S. Department of Commerce Bureau of Industry and Security Office of Technology Evaluation, (2010).

Gassend, B., et al. "Silicon physical random functions," in proc. 9th ACM Conference on Computer and Communicatios Secutiry (CCS '02), 148-160 (2002).

Guajardo, J., et al. "FPGA Intrinsic PUFs and Their Use for IP Protection," in proc. 9th International Workshop on Cryptographic Hardware and Embedded Systems (CHES '07), 63-80 (2007).

Jun, B., et al. "The Intel random number generator," Intel Corporation, (1999).

Keija, Z., et al. "A novel ASIC implementation of RSA algorithm," in proc. 5th International Conference on ASIC (ICASIC'03), 1300-1303 (2003).

Kim, C.H., et al. "On-die CMOS leakage current sensor for measuring process variation in sub-90nm generations," in proc. 2004 Symposium on VLSI Circuits (VLSIC '04), 250-251 (2004).

Koushanfar, F., et al. "Hardware Metering," in proc. Design Automation Conference 2001 (DAC '01), 490-493 (2001).

Koushanfar, F., et al. "Intellectual Property Metering," in proc. 4th International Workshop on Information Hiding (IHW '01), 81-95 (2001).

Kumar, S.S., et al. "Extended Abstract: The Butterfly PUF Protecting IP on Every FPGA," in proc. IEEE International Workshop on Hardware-Oriented Security and Trust (HOST '08), 67-70 (2008).

Livingston, H. "Avoiding Counterfeit Electronic Components," *IEEE Transactions on Components and Packaging Technologies*, 30(1): 187-189 (2007).

Lofstrom, K., et al. "IC identification using device mismatch," in proc. IEEE International Solid-State Circuits Conference (ISSCC), 372-373 (2000).

"PCKS #1 v. 2.1: RSA Cryptography Standard", ftp://ftp.rsasecurity.com/pub/pkcs/pkcs-1/pkcs-1v2-1.pdf, RSA Security, (2002).

Rivest, R.L., et al. "A method for obtaining digital signatures and public-key cryptosystems," *Communications of the ACM*, 21(2): 120-126 (1978).

Roy, J.A., et al. "EPIC: Ending Piracy of Integrated Circuits," in proc. Design, Automation and Test in Europe 2008 (DATE '08), 1069-1074 (2008).

Stradley, J., et al. "The Electronic Part Supply Chain and Risks of Counterfeit Parts in Defense Applications," *IEEE Transactions on Components and Packaging Techonologies*, 29(3): 703-705 (2000).

Suh, G.E., et al. "Physical Unclonable Functions for Device Authentication and Secret Key Generation," in proc. 44th ACM/IEEE Design Automation Conference (DAC '07), 9-14 (2007).

Sunar, B., et al. "A Provably Secure True Random No. Generator with Built-In Tolerance to Active Attacks," *IEEE Transactions on Computers*, 56(1): 109-119 (2007).

"Synopsys VCS", http://www.synopsys.com/Tools/Verification/FunctionalVerification/Pages/VCS.aspx, Synopsys, Inc., (2012).

\* cited by examiner (a) Inserted at flip-flop inputs (b) Inserted at flip-flop outputs

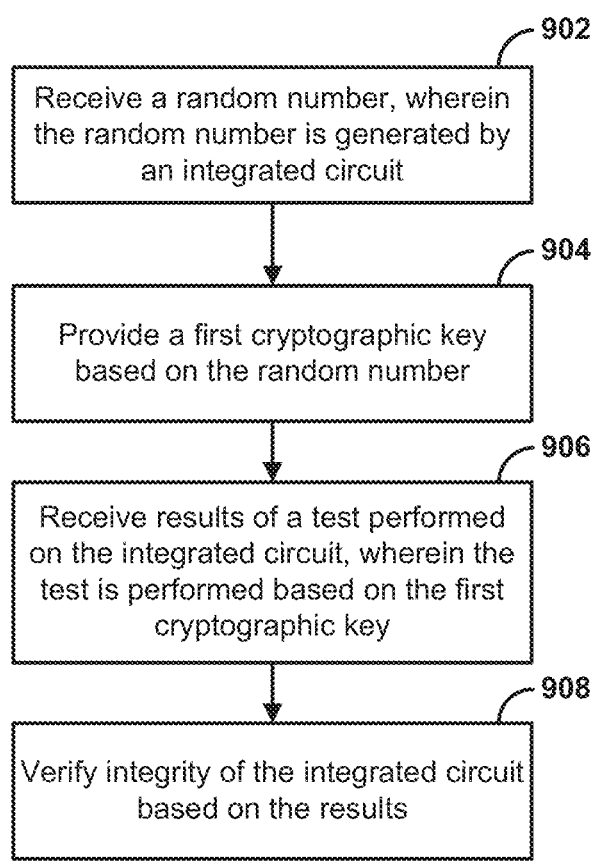

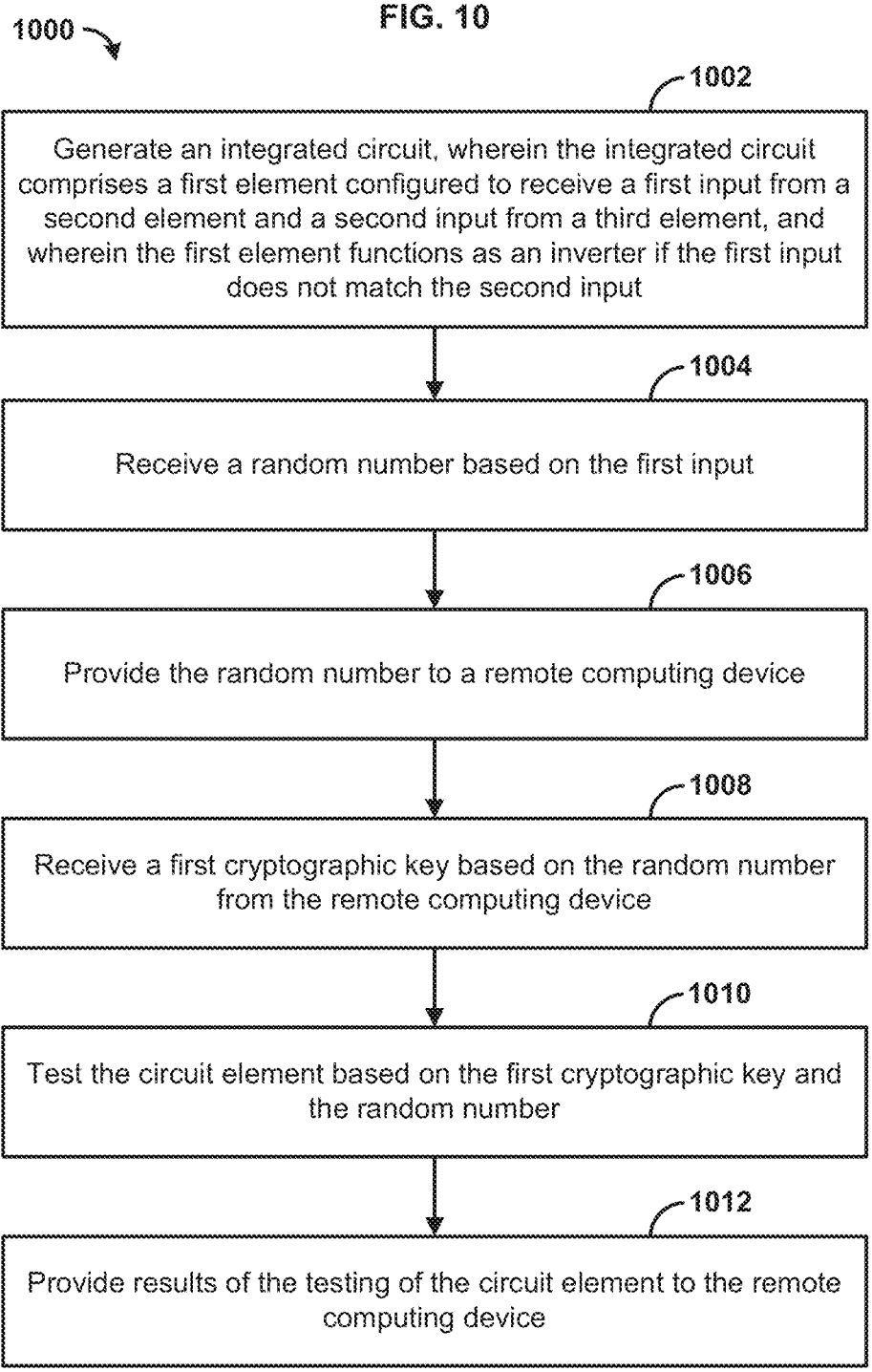

METHODS AND SYSTEMS FOR HARDWARE PIRACY PREVENTION

CROSS REFERENCE TO RELATED PATENT APPLICATION

This application claims priority to U.S. Provisional Application No. 61/798,648 filed Mar. 15, 2013, herein incorporated by reference in its entirety.

BACKGROUND

As the size of the integrated circuit (IC) industry has increased, and more ICs are fabricated off-shore, the size of the IC counterfeiting market has increased considerably. Counterfeiters are finding new and interesting ways to introduce their wares to market. IC manufacturers who fabricate ICs occupy a unique position in the IC supply chain. Intellectual property (IP) owners have to turn over their full IC design, as well as test patterns and test responses, to foundries to allow them to fabricate and test the ICs. The high cost of IP development puts the parties involved in IC manufacturing and testing in a position where it is possible to profit from exploitation of the IP they have been provided with.

One example of such would be if a foundry were to produce more ICs than they were commissioned to make, allowing them to sell these over-produced ICs for the low cost of the materials needed, without having to pay the high cost of the IP development [1]. Another example would be if they were to sell, rather than discard, the defective ICs that they have produced. It is worth noting that a defect could be subtle and difficult to detect, causing the IC to appear functional despite a known error in rare cases. Additionally, it is possible that a foundry or assembly produces an IC which functions correctly in most ways, but is in some way outside of specification. For example, an IC which cannot function at its specified frequency without exceeding some power requirement could be considered an out-of-spec IC. These types of ICs may function correctly in most ways but do not fully meet their specification.

In general, counterfeit ICs represent serious reliability and security concerns, especially with regards to secure, life-threatening, or mission-critical applications [6]. Various techniques have been proposed as ways to combat IC counterfeiting over the last several years. For example, one method for detecting counterfeit ICs is for an IP owner to uniquely identify each manufactured IC and maintain each IC's ID in a database. Counterfeits can be detected by checking an IC's ID against that database, with ICs not in the database being considered counterfeit. These IDs can be as simple as a bar code sticker [7], or they can be intrinsic to the IC, being produced by exploiting the process variations found in manufactured ICs [8]. Physical Unclonable Functions (PUFs) are a class of silicon hardware structures which produce different outputs in different ICs based on the unique process variations of the ICs they are used in [9]. Ring oscillator (RO) based PUFs (RO-PUFs) [10] can produce the same kind of static, yet unique and reliable identifiers. Other types of PUF, such as the Arbiter PUF [9], use a challenge and response scheme. Use of a challenge-and-response mechanism still requires an ID database and ID checking as described above. However, this allows the IP owner to maintain a secret challenge which only they know and use to identify ICs, making it more difficult for counterfeiters to tamper with or fabricate the identifier.

Another approach to prevent counterfeiting is by requiring that ICs be "activated" by the IP owner after being fabricated by the foundry. Several "active metering" techniques aim at preventing over-manufacturing by requiring that the foundry retrieve "passwords" from the IP owner after fabricating each IC [15] [16] [19]. By requiring the foundry to disclose the existence of every IC they would like to activate, the IP owner is able to "meter" the production of ICs.

The above techniques address only part of the IC counterfeiting problem. Some basic implementations of IC identification techniques, such as the example of the barcode sticker, are easy to fake, especially if the IP owner is not proactive in their counterfeit detection efforts. Even the more technically advanced PUF-based identification techniques, while making counterfeit detection possible, do nothing to actually prevent counterfeit production. The active metering techniques described above do attempt to prevent counterfeits from ever being produced. However, these techniques do not prevent production of all types of counterfeits. This is because these techniques require that the IC be activated before the IC can be tested. The IP owner is required to provide the "key" to the IC before they know that the IC is not defective and is within specification. This may allow the foundry to sell defective or out of spec ICs, which have already been activated by the IP owner. In addition, a foundry can request more keys than necessary from the IP owner by pretending that the yield is low. Thus, the foundry can place many functional (defect-free) ICs in market.

SUMMARY

It is to be understood that both the following general description and the following detailed description are exemplary and explanatory only and are not restrictive, as claimed. Provided are methods, systems, and devices for hardware piracy prevention.

In an aspect, provided is a circuit comprising a first element configured to receive a first input and a second input, wherein the first element is configured as a buffer when the first input matches the second input and configured as an inverter when the first input does not match the second input, a second element coupled to the first element, wherein the second element is configured to provide a random number as the first input to the first element, and a third element coupled to the first element, wherein the third element is configured to receive encrypted data, decrypt the encrypted data, and provide at least a portion of the decrypted data as the second input to the first element.

In a further aspect, provided are methods of verifying a circuit, comprising receiving a random number, wherein the random number is generated by an integrated circuit, providing a first cryptographic key based on the random number, receiving results of a test performed on the integrated circuit, wherein the test is performed based on the first cryptographic key, and verifying integrity of the integrated circuit based on the results.

In another aspect, provided are methods for manufacturing a circuit, comprising generating an integrated circuit, wherein the integrated circuit comprises a first element configured to receive a first input from a second element and a second input from a third element, and wherein the first element functions as an inverter if the first input does not match the second input, receiving a random number based on the first input, providing the random number to a remote computing device, receiving a first cryptographic key based on the random number from the remote computing device, testing the integrated circuit based on the first cryptographic key and the random number, and providing results of the testing of the circuit element to the remote computing device.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 9 illustrates exemplary method; and

FIG. 10 illustrate exemplary method.

DETAILED DESCRIPTION

Figure 1:
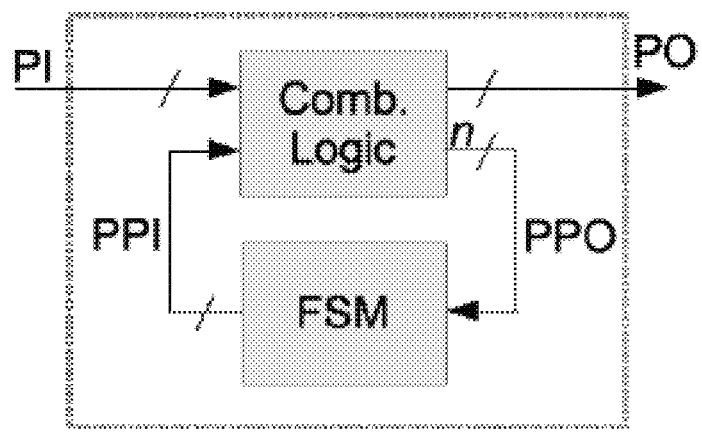
FIG. 1 illustrates an abstraction of an integrated circuit design.

Before the present methods and systems are disclosed and described, it is to be understood that the methods and systems are not limited to specific methods, specific components, or to particular configurations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Disclosed are methods, systems, and devices which can both detect and prevent the creation and sale of over-produced, defective, or out-of-spec ICs. In an aspect, the methods and systems can be referred to as a "secure split-test," that can reintroduce trust into the IC fabrication process by re-introducing the IP owner into the IC testing process without requiring IP owners to be physically present at a foundry/assembly. By adding cryptographic functionality, unique binary identifiers, and/or combinational locking logic to an IC design, IP owners can create ICs which can be tested by the foundry and assembly, but whose test results can only be verified by the IP owner, or the agent of the IP owner. Additionally, only the IP owner can generate the correct "key" that can unlock an IC's full functionality. These additions can make it so that IP owners can control the exact number of fully functional ICs which are released to market. In an aspect, unauthorized ICs are non-functional and can be easily detectable.

In an aspect, the methods, systems, and devices disclosed can utilize one or more random generators. In an aspect, the one or more random generators can be a "True Random Number Generator" (TRNG). Various TRNGs can be configured for insertion in ICs [2] [4]. The different methods used in implementing TRNGs dictate the ways that TRNGs can be used in an IC. Two qualities of any TRNG are randomness of the system and stability of the system. The randomness of a TRN can be measured by comparing the number of bit-position differences between a large number of TRNG outputs. In an aspect, any two TRNs can have differences in approximately 50% of bit positions, a measurement which is called Hamming distance. The stability of a TRNG system can be established by measuring output of a system many times across a large range of environmental conditions. In an aspect, a TRN system can produce the same results regardless of changes in temperature, noise, age, or other conditions.

The two properties of stability and randomness can dictate when a particular TRNG implementation can be used. An example involves TRNs which are going to be used for cryptographic purposes. Many PUFs can be used to generate random numbers, but TRNs that are used for cryptographic purposes can have what amounts to a 100% stability requirement, which can be difficult to obtain with PUFs as they are sensitive to environmental variations [10]. PUFs which are going to be used for cryptographic purposes generally need to be either specially designed to always produce the same value, or use extensive additional error correction hardware, such as that describe for use with the RO-PUF [10].

A generalized TRNG block can be used in the disclosed methods, systems, and devices. Such a TRNG block can produce a truly random number that is unique to each IC into which it is inserted and has perfect stability, e.g., it has the same value every time it is measured throughout the lifetime of the IC. However, it is also possible to use a less stable TRNG whose output is stored in on-chip ROM when the IC is first powered-on and tested.

In an aspect, the disclosed methods, systems, and device can utilize RSA Asymmetric Encryption. The RSA asymmetric cryptographic algorithm was first publicly described in 1978 [17], and was released into the public domain slightly less than 20 years afterwards. RSA is a public-key cryptographic system, which means that the encryption and decryption processes can be performed using different keys. Security assumptions about RSA can be made based on the apparent difficulty of being able to discover the private key used for decryption from the public key used for encryption.

The public key is created by finding two large random prime numbers p and q and multiplying them to obtain a modulus n. Once n has been calculated, a public exponent e and a private exponent d are found. The final public key is described as (n, e) and the final private key can be described as (n, d). By using these two keys and the special properties that come about through the way that the keys are created, one can use the keys to perform a reversible encryption process. To encrypt a message m with a public key (n, e), $m^e$o/on can be computed. To reverse this operation with a private key (n, d), encrypted message c and compute $c^d$o/on can be taken. Similarly, one could use a private key (n, d) to encrypt a message by computing $m^d$o/on which can later be decrypted using the public key (n, e) by computing $c^e$o/on. However, since the public key is by definition public, this data is not exactly "encrypted." This operation, usually called "signing," can be used to verify the identity of a party sending information and to verify that the information was not tampered with. In practice, RSA is a theoretically sound algorithm whose individual implementations can be often vulnerable to serious attacks. To address those types of attacks, it can be assumed that any use of RSA discussed in the disclosure describes use of an industry-verified secure implementation of the RSA algorithm that implements the many security standards relating to the Algorithm, such as the PKCS #1 standard [3].

The disclosed methods and systems can be used for securing test processes of an integrated circuit (IC) by adding three basic blocks to an IC in design stage. In an aspect, an abstraction of an IC's logical functionality can divide the IC into combinational logic and the memory elements, which can make up the finite state machine that controls that logic, as shown in FIG. 1, wherein PI, PO, PPI, and PPO represent primary inputs, primary outputs, pseudo-primary inputs, and pseudo-primary outputs, respectively. New blocks can be added to the abstraction to remotely control both testing process and the functionality of the IC.

Figure 2:
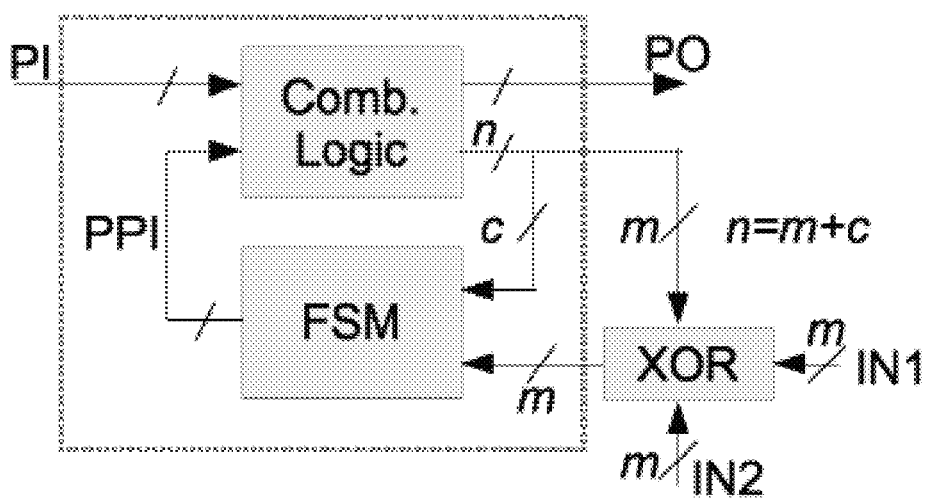
FIG. 2 illustrate an abstraction of an IC design with an XOR mask.

In an aspect, an XOR mask can be a series of 3-input XOR gates which can be inserted into non-critical paths in an IC. The XOR mask can be used in a way that is similar to combinational locking techniques described in various hardware metering works [16] [19]. In an aspect, the differences between an XOR mask described herein and other combinational locking techniques are the types of gates used, the placement of those gates, and/or the purpose of the gates. As an example, two m-bit inputs IN1 and IN2 can be created to an otherwise unmodified IC, as shown in FIG. 2. The two m-bit inputs can potentially modify an IC, if the two input values to any particular XOR are not the same. If the two inputs to an XOR are the same, that particular part of the XOR mask can act as a transparent buffer. If the two inputs are not the same, the XOR mask can act as an inverter.

Figure 3:
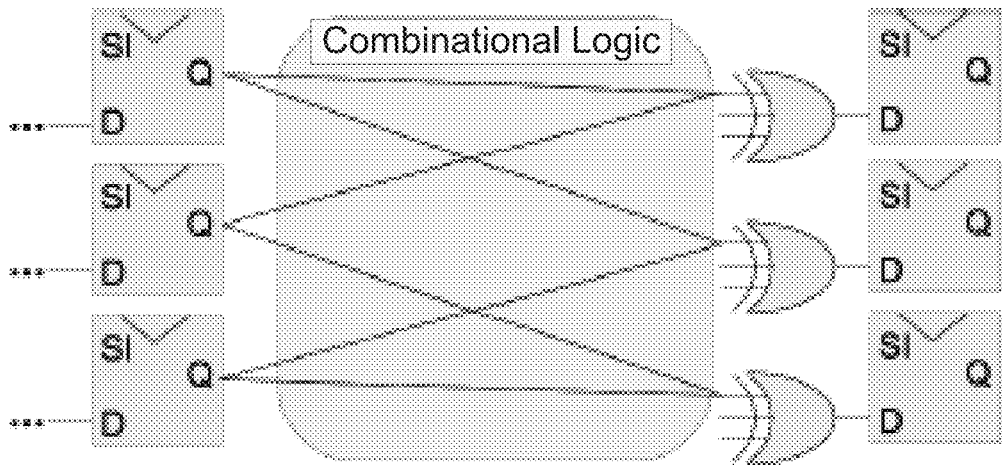
FIG. 3 illustrates an XOR mask insertion schemes.
Figure 3:
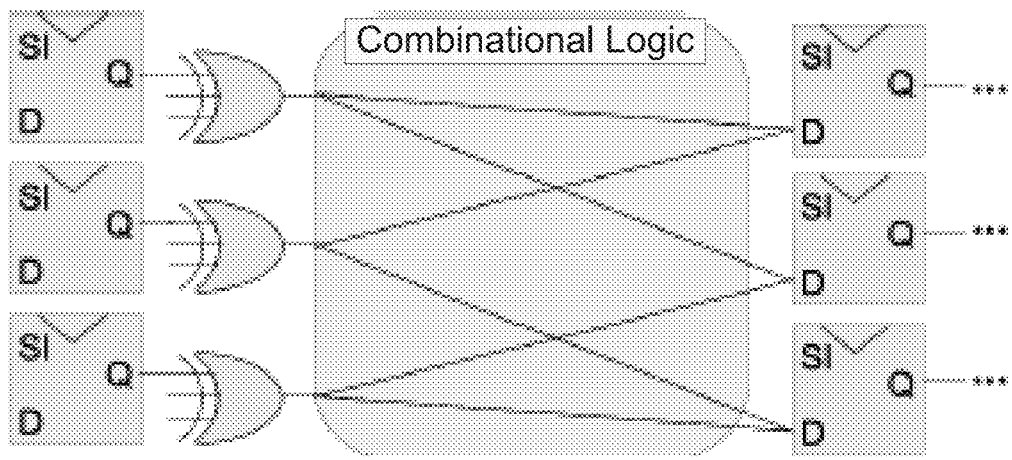

The placement of the XOR masks into an IC can dictate how the XOR masks can affect the circuit. Each XOR mask can be, at any time, either a buffer or an inverter. In an aspect, the XOR masks can be placed at the inputs of flip-flops in an IC. In another aspect, the XOR masks can be placed at the output of flip-flops in a circuit. Both designs are shown in FIG. 3. In either case, the use of scan chains in an IC is unaffected.

When the XOR masks are placed at the inputs of flip-flops, as shown in FIG. 3(a), the affected flip-flops can receive an inverted value when data is stored. Which flip-flops are affected can be determined by the two m-bit inputs IN1 and IN2. In an aspect, inserting random inverters into an IC can change data captured by portions of the flip-flops at the rising edge of a clock signal. The randomized data can be propagated to a next stage of logic in the IC at a next clock cycle.

Adding inverters can change logical specification of the design of the IC in functional mode. In a single clock case, wherein there is only one clock cycle, an inverter's effects are not propagated. For example when a pattern is scanned into an IC and applied, and results can be captured in scan flip-flops (structural test [24]). In this case, the effect of having the inverters is that some scan flip-flops can be capturing an inverted value. This property is useful as it means that the ICs can be tested, and the test results are related to IN1 and IN2.

When XOR masks are inserted at the outputs of flip-flops, as shown in FIG. 3(b), the effect is an inversion of the input values to the combinational logic. The functional result remains in place, the IC's logical specification can be changed and the IC cannot function correctly. However, the single-cycle property can be lost, where the effect in one cycle is that the captured value may be inverted. Sending potentially inverted values into the combinational logic, rather than potentially inverting the output value of the combinational logic, can change the logical specification of the design of the IC significantly. A full logical simulation of the IC with the particular m-bit inputs IN1 and IN2 can successfully predict the state of the IC.

Figure 4:
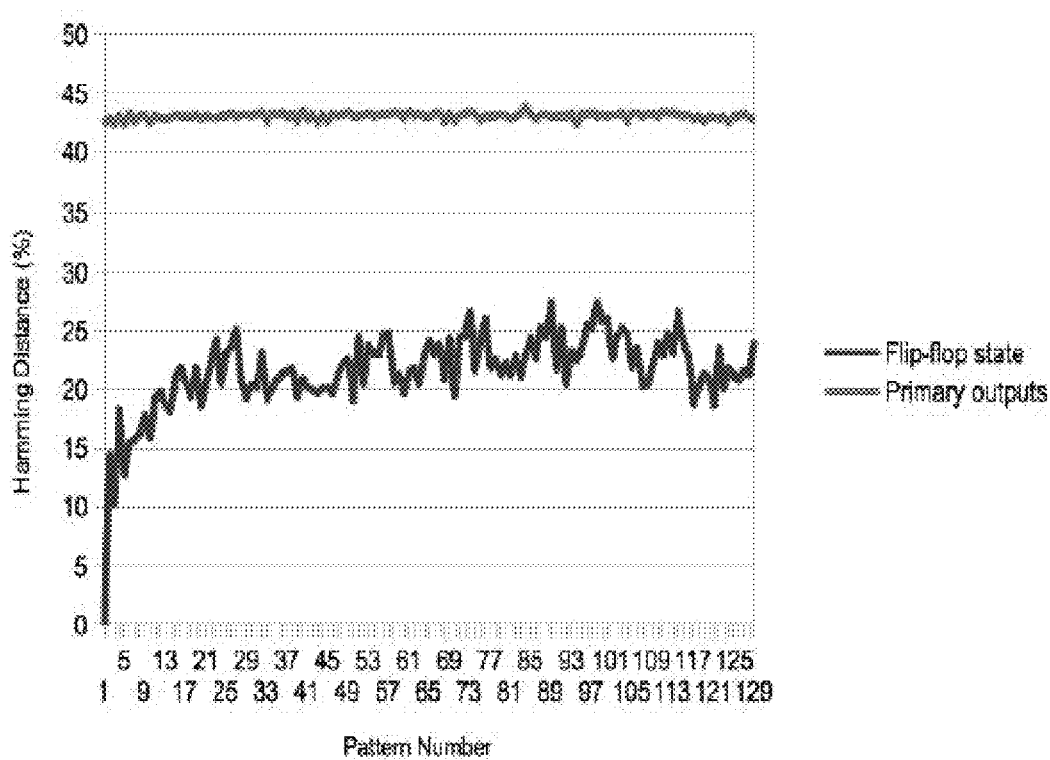
FIG. 4 illustrates effects of XOR masks inserted at flip-flop inputs and primary outputs.

FIG. 4 shows how the addition of an XOR mask as shown in FIG. 2 can affect the functionality of an IC. 64 ICs were simulated using Synopsys's logic verification tool VCS [23]. The ICs were synthesized implementations of the ISCAS'89M benchmark s15380, with 80 inputs, 151 outputs, 1245 gates and a scan chain with 442 scan flip-flops. An XOR mask of size m=128 was inserted onto non-critical flip-flop terminated paths in the circuit, and each of the 64 ICs had its own unique and distinct values for IN1 and IN2 applied to the XOR mask. A pattern set of 128 randomly-generated patterns was applied to each IC, and after each pattern the flip-flop state was observed. FIG. 4 shows the average Hamming distance between each of the 64 ICs' flip-flops after each pattern application. The average Hamming distance starts low because each IC initially starts in the same state, but over time it increases to a point where the state of each IC is actually significantly different from every other IC. These results demonstrate that the XOR mask can add a type of non-determinism to the IC: without direct control over the inputs of the XOR mask, the state of the IC is not directly controllable. In an aspect, an XOR mask was added to the primary outputs of the IC, with Hamming distance between the primary outputs being measured after each pattern. The average Hamming distance after each pattern is also shown in FIG. 4. The average Hamming distance is higher in this case because the XOR mask of size m=128 affects a higher percentage of the primary outputs, of which there are only 151, than it affects the flip-flops, of which there are 442. However, the result is more constant over time, because the XORs of the XOR mask are all in the same stage of the IC.

In an aspect, an XOR mask can require two m-bit inputs IN1 and IN2 to control it. Each of the inputs can serve a different purpose in achieving security goals. The first of the two m-bit inputs (IN1) can be the output of a m-bit TRNG block. The output of the m-bit TRNG block can be used to statically configure the XOR mask. This can be accomplished by using a TRNG implementation, or by storing the output of the TRNG implementation in ROM when an IC is first powered on. Because of the permanence of the m-bit value, it can configure the XOR mask to behave in a particular and predictable manner which can be unique to each manufactured IC. Although the incorrect IC functionality induced by the XOR mask can be a means of detection, the TRNG block can have another usage, which is a passive identification mechanism. As several pieces of work have demonstrated that unique identifiers can be used to track ICs throughout their lifetime [8] [9].

In an aspect, an RSA block capable of performing a RSA modular multiplication operation can be used. The RSA block can perform one or more RSA signing operations. For example, the RSA block can receive a value that has been encrypted with an RSA private key, and the RSA can decrypt and verify the value using the appropriate RSA public key. In an aspect, the RSA public key can be embedded into the design of an IC, and hardware can perform modular exponentiation using the RSA public key. In an aspect, the input to the RSA block can be stored in flash memory so that the last provided input to the RSA block can be stored, yet mutable.

A portion or all of the output of the RSA block can be used as the second m-bit input (IN2) to an XOR mask. An output from a RSA block or a TRNG block can be connected to a plurality of XOR masks, thereby using XOR masks which are larger than limited size of the RSA modulus. In an aspect, having an m-bit input as the output of an RSA operation can create several properties for an IC. For example, any party without the RSA private key can have no direct control over the output of the RSA block. Sending any arbitrary input through the RSA block can be equivalent to encrypting the input. The output can be designed to be randomized and unknown until an operation has been performed, as well as being irreversible.

Figure 5:
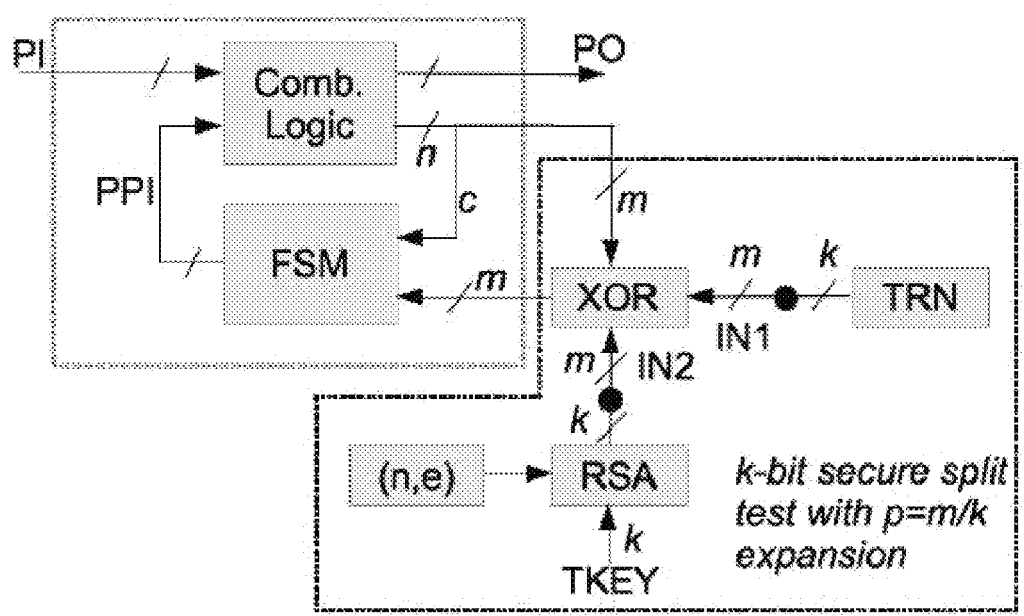
FIG. 5 illustrates secure split-test structure.

In an aspect, a secure split-test structure can comprise one or more of: (1) an XOR mask, (2) a TRNG block which can act as a first input to the XOR mask, and/or (3) an RSA block which can act as a second input to the XOR mask. An example sum of augmentations made to an IC is shown in FIG. 5. In a manufactured IC, a TRNG output can be fixed and a RSA block output can be controllable by a party who has possession of the RSA private key that goes along with the RSA public key in the IC. In an aspect, the TRNG block can act as a configuration device for the XOR mask. The RSA block can act as a keying device for the configured TRNG block.

In an aspect, when two m-bit inputs IN1 and IN2 are the same, all of the XORs in the XOR mask can act as transparent buffers. In this case, it is as if all of the modifications made to the IC disappear, and the IC can function as originally designed. In an aspect, one of the m-bit inputs, the TRNG block, can be permanently fixed upon the ICs manufacturing. In an aspect, the second m-bit input cannot be controlled, it is the output of the RSA block. However, control over the second m-bit input can be possible if one is in possession of the RSA private key that goes along with the RSA public key embedded in the design. Thus, the only party who can be capable of deterministically placing an IC into a fully functional state is an IP owner, who knows both the IC's TRNG and the correct RSA private key.

Even though an IC cannot be placed into a fully functional state without the correct RSA private key, the IC can still be tested when using an incorrect RSA private key. For a single-cycle test during scan chain testing, the errors can be propagated once, resulting in some bits of the scan output being inverted. This means that each IC can be tested without the correct key. In one aspect, every IC can be provided with a different RSA private key, the test results can be verified using so long as what RSA private key was used and the IC's TRNG via a XOR operation.

Figure 6:
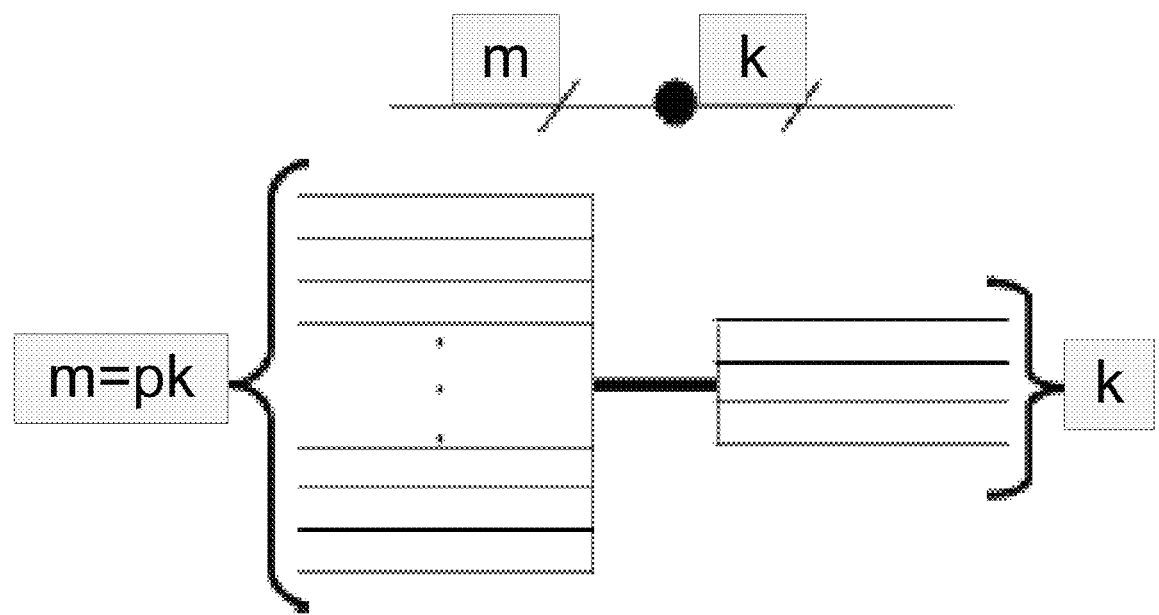
FIG. 6 illustrates k-bit RSA and TRNG blocks having a fan-out of p to support XOR masks of size m=pk.

In an aspect, an m-bit TRNG or m-bit RSA block can be used to create m-bit inputs. In certain scenarios, a value of m when it is infeasible to create an m-bit TRNG or m-bit RSA blocks. In this case, an expansion on the outputs can be performed, as shown in FIG. 6. The expansion can send each of the k outputs of the TRAN blocks or RSA block to p different XOR gates in a m-bit XOR mask, expanding the k-bit outputs into m=pk outputs.

Figure 7:
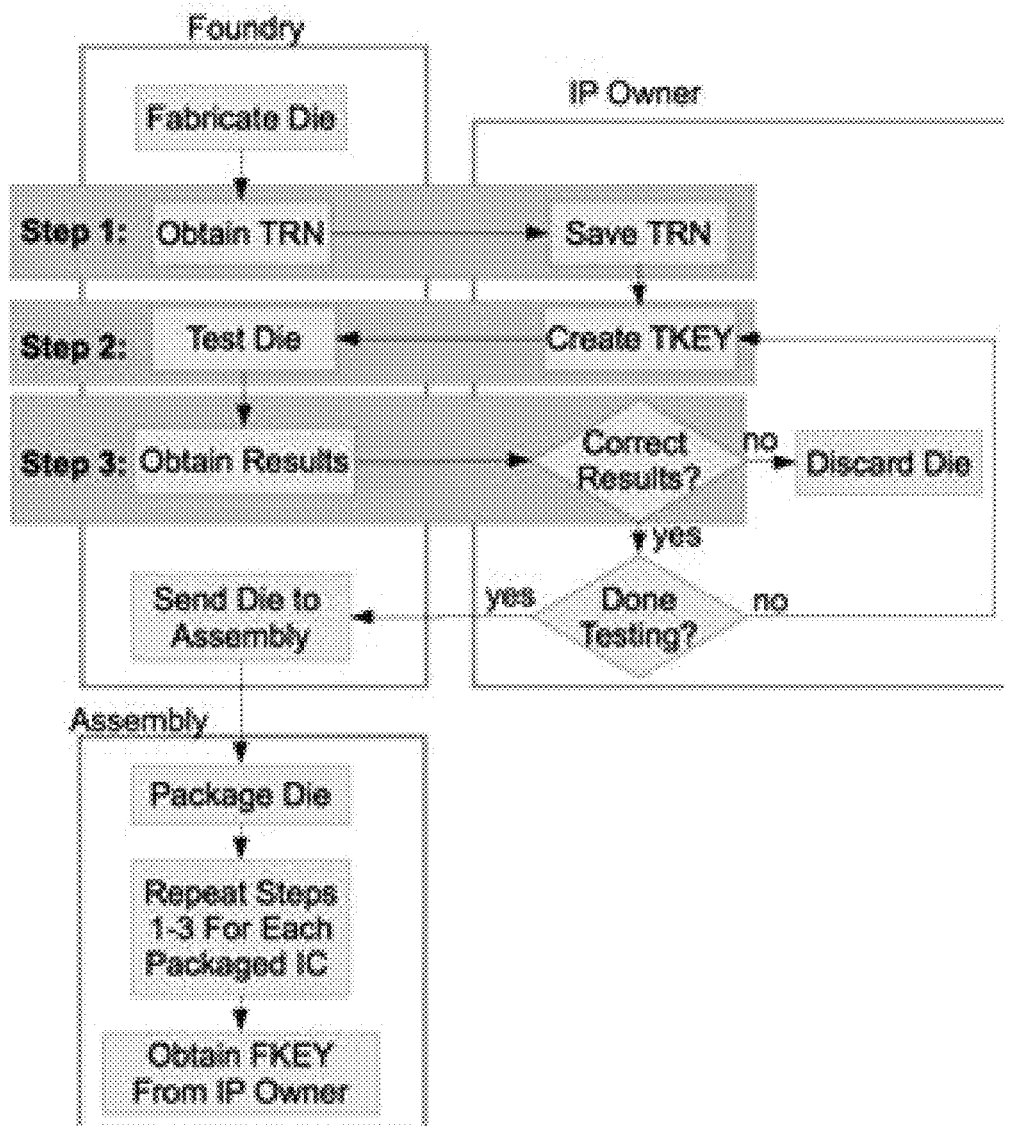
FIG. 7 illustrates secure split-test communications flow.

By adding the disclosed components and functionality to the design of an IC, the IC design can be more secure because only the IP owner can tell whether or not an IC operates correctly, and made so that only IP owner, or agent, can place the IC into a fully functional state. In an aspect, a foundry that produces an IC can communicate with IP owner in order to test the ICs and to activate the ICs. FIG. 7 shows general communications flow between a foundry/assembly and an IP owner. For example, the foundry can fabricate the ICs with GDSII provided by the IP owner. The IP owner can also provide the foundry with the test patterns required to test the IC. Once a die has been fabricated, the foundry can retrieve a TRN from the IC. The foundry can then send the TRN to a remote computing device managed/operated by the IP owner. The IP owner can then send the foundry a test key, called TKEY, which can be to be used on the die. The foundry can then proceed to test the die.

In an aspect, the foundry cannot decide whether or not the die is functioning correctly based on the results of the test, using the provided TKEY. This is because the results of the test have been altered based on the TKEY and the TRN that were used during the test. These results can be checked by the IP owner. If the IP owner determines that the die was not working correctly or suspects that the foundry purposefully altered the results in order to deceive the IP owner, the IP owner can inform the foundry to discard the die. If the IP owner determines that the die is working correctly, the IP owner can either send a new TKEY to be used in further tests, or can inform the foundry to send the IC to an assembly for packaging and package-level test.

As an example, the foundry and the IP owner can be in communication via a private and/or public network, such as the Internet or a local area network. Other forms of communications can be used, such as wired and wireless telecommunication channels.

The assembly can follow the same general flow shown in FIG. 7, where the assembly facility can obtain the TRN, request a TKEY, and send the test results to the IP owner, and wait for a response (e.g., go/no-go response) from the IP owner. After the IC has been determined to be functioning correctly, the IP owner can send the assembly facility a final key FKEY required for that IC to be considered fully operational. The FKEY can be different for different ICs because of the different TRNG block outputs in each IC. In an aspect, an IP owner can be aware of each fabricated IC, determine whether each IC is functioning correctly, and can prevent full functionality of an IC from being available until just before the IC is shipped to market. As a result, over-manufactured and defective ICs can be prevented from being sent to market.

The disclosed methods and systems can also be adapted to work with internal sensors in an IC to prevent out-of-spec ICs from being sent to market. In an aspect, if a sensor is able to describe the characteristics of an IC, for example, delay [20], leakage current [21], or transient current [22] data, and store the characteristic information in memory elements (e.g., flip-flops), the flip-flops of the sensor can be incorporated into scan chain of the IC and XOR masks can be inserted on some of those paths. As a result, specification of the IC can be sent to an IP owner for verification, but has been altered by TRNG and RSA blocks so that the IP owner can verify that the output is the correct value for that IC.

The area overhead of the disclosed methods, systems, and devices can be related to physical blocks added to an IC design. The most noteworthy aspect of the area overhead is the fact that the physical size of each block adding to the circuit can be related to the RSA modulus size. Assuming using an RSA modulus of size k, one can easily estimate the area of each block. A block which implements the k-bit RSA modular exponentiation process can take k-bit inputs and produce k-bit outputs. The k-bit output can be used to configure an XOR mask and a TRNG block. In an aspect, TRNG block needs to produce a TRN output of k bits. Based on the expansion concept, m=pk XOR gates can be added to the IC, with p being an integer multiplier of k. Choice of m can be implementation specific depending on the size of the IC. In an aspect, ROM storage can be used for the RSA public key and Flash storage for the input key TKEY. Both can be approximately k bits, because two k-bit values can be stored and one comparatively small public exponent.

There can be restrictions on the values of k. For example, RSA moduli can be large powers of two. In an aspect, the minimum recommended modulus size can be 1024 bits. RSA implementations can have different areas based on goals and features. An RSA implementation can be used to minimize area overhead. One such implementation required 14K gates [18]. In an aspect, an RSA public key can be stored, and exponent in ROM, which can be overestimated as requiring another 1024 gates. This can be an over-estimate because ROM can use as little as one transistor per bit with a small control overhead. A similar estimate for the Flash memory can be used. The area overhead of a TRNG block can be more variable than that of the RSA block, as different TRNG implementations can require different area overheads. One example would be to build off of the relatively stable RO-PUFs described in [10]. These used six gates per ring oscillator and 8 ring oscillators per bit to generate highly reliable cryptographic keys. To generate a 1024-bit TRN with this PUF would require 1024_8_6_50K gates, as well as another k=1024 bits of ROM to store the value. As an example, when p=1, which means k=1024 XOR gates can be inserted into the IC, which can be a rough estimate of (14K+1K+1K)+(50K+1K)+1k_68K gates, which would be 6.8% of a million gate circuit, 0.68% of a ten million gate circuit, and 0.068% of a hundred million gate circuit. Area overhead estimates for other values of p are shown in Table 1. In an aspect, the actual area overhead can be smaller than those shown in Table 1.

TABLE 1

Area overhead using k = 1024.

| | | Area Overhead | | |
|---|---|---|---|---|
| $p = \frac{m}{k}$ | m | 1M | 10M | 100M |
| 1 | 1024 | 6.8% | 0.68% | 0.068% |
| 2 | 2048 | 6.9% | 0.69% | 0.069% |
| 5 | 5192 | 7.2% | 0.72% | 0.072% |
| 10 | 10140 | 7.7% | 0.77% | 0.077% |

Secure split-test does not impose significant requirements on the ways through which the IC can be tested. When performing scan based testing, none of the components inserted actually interfere with the testing process. The XOR mask does not impact the scan shift process. Test patterns (e.g., stuck-at, transition delay, path delay) can still be scanned into an IC and applied to the logic, and the results of the patterns can still be scanned out to be checked. What the XOR mask can do is invert up to m of the values that are captured by the scan flip-flops. To know which values in the scan output have been inverted, the XORs in the XOR mask that have been enabled to work as inverters need to be known, which requires knowledge of the output of the RSA block and the output of the TRNG block. ICs using the secure split-test technique do not need new or different patterns relative to ICs based on the same design.

Secure split-test can result in increased test time. The test time overhead can come from two-way communications between the foundry and the IP owner. In an aspect, a foundry or assembly testing the ICs can send a TRN and test results back to an IP owner. The IP owner can send back keys to test the ICs with and go/no-go responses relating to the test results. In an aspect, the IP owner computes the test keys and determine whether or not the test results are correct. In an aspect, if the IP owner were to provide a foundry with the correct maximum number of test keys along with the test patterns, and the foundry did not send the IP owner the test results until all ICs had been tested, there would be almost no test time overhead during the testing process, except for the time required to change the test key or to read out the TRN value. The only overhead that would occur in this scenario would come from the fact that, since the foundry would not be able to tell if a particular test on a particular IC passed or failed, the foundry would have to run all of the tests on each IC without being able to stop running tests on an IC after it failed once.

The secure split-test can significantly increase the security of the IC supply chain. Different attacks can comprise: (1) attacks on the design of the disclosed method (direct attacks), (2) attacks which attempt to deceive the IP owner or avoid the disclosed method (circumvention attacks), and (3) hardware-based attacks that tamper with or remove the split-test blocks (removal attacks).

Secure split-test can be relatively resilient to direct attacks. Each IC can have one of extremely few passwords to reach a fully functional state, and from a hardware perspective it would be easy to have a single output pin which indicates whether or not the IC is in that state. The problem of finding a password that puts the IC into a full functional state is equivalent to the problem of bypassing RSA. An attacker who tries to bypass this technique would have two options: (i) randomly generate potential keys in the hopes that they find one which works for a known TRN, or (ii) factor the public modulus into its component primes so that they can find the private key themselves and instantly generate the correct key. Both of these methods are known to be difficult, they can represent either trying to brute-force or directly crack RSA. They can be considered infeasible.

Attacks which try to bypass secure split-test technique cannot fully defeat the technique. For example, it might be possible for an attacker to know which XORs in an IC have been activated by the key/TRN combination used the IC. This may, if the attacker has detailed knowledge of the internal design of the IC, allow the attacker to know which bits of the scan output have been inverted. This would in turn allow the attacker to know whether or not the IC was working, and would allow the attacker to change values as appropriate to make it look like the IC did or did not function correctly. An attacker who made a correctly functioning IC look like it functioned incorrectly would gain nothing. The IP owner would never send the correct key for the IC and thus that working IC would never be useful to the attacker. An attacker who made an incorrectly functioning IC seem to function correctly may be able to get a correctly functioning key for the IC. However, since the TRNG block can track ICs throughout their lifetime, this would be noticed, reflecting poorly on the foundry allowed this to happen.

It is possible that the foundry may try to remove some or all of the hardware needed by this technique. Exactly how much they can remove depends on how much they know about the logic design of the IC. For example, they could not blindly remove any XOR gate whose output connects to a flip-flop input they would have to know whether or not the XOR gate was part of the XOR mask. Attacks that aimed to tamper with or remove the TRNG block or RSA block would have to be very carefully designed to avoid detection. This is especially true because, as specified, this technique implements a basic metering methodology that requires foundries to report each IC back to the IP owner and requires that the IP owner provide a working key for the IC. Attacks that altered the way that the TRNG or RSA blocks worked would also have to avoid communications with the IP owner, as the TRNG and RSA blocks directly affect the scan output during testing.

In an aspect, if a foundry or assembly were to attempt to place ICs utilizing secure split-test into market without trying to defeat the technique. Unauthorized ICs will not have been provided with the correct FKEY that they require to function correctly. Over-produced ICs, ICs with minor defects, or out-of-spec ICs that a foundry or assembly might try to place into market can be easy to detect for at least two reasons. First, the IP owner has maintained a database of all known and authorized TRNG block values, which can be used to detect counterfeiting by randomly sampling market and checking the TRNG values to look for unauthorized ICs. Second, ICs cannot function correctly. As shown in FIG. 4, internal states of ICs which do not have the correct key can diverge radically over time. These ICs cannot be usable, and would be detectable through the use of functional test patterns.

Figure 8:
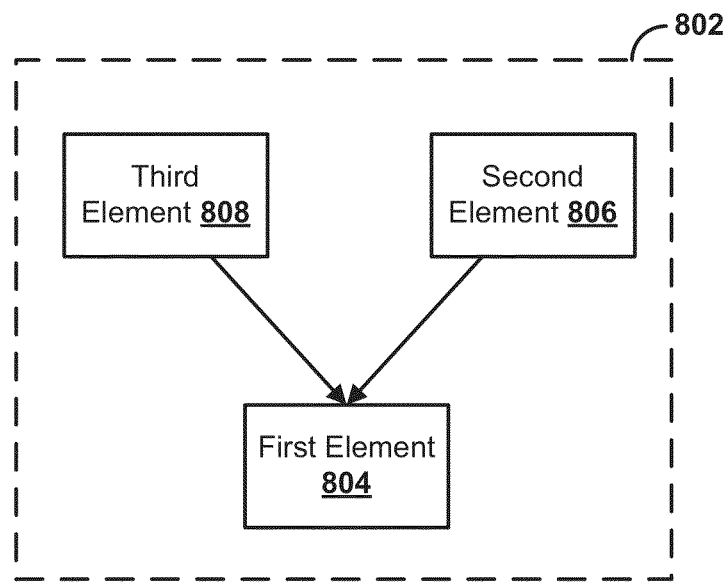
FIG. 8 illustrates an exemplary circuit.

In an aspect, illustrated in FIG. 8, provided is a circuit 802 comprising, a first element 804 configured to receive a first input and a second input, wherein the first element is configured as a buffer when the first input matches the second input and configured as an inverter when the first input does not match the second input, a second element 806 coupled to the first element 804, wherein the second element 806 is configured to provide a random number as the first input to the first element 804, and a third element 808 coupled to the first element 804, wherein the third element 808 is configured to receive encrypted data, decrypt the encrypted data, and provide at least a portion of the decrypted data as the second input to the first element 804.

In an aspect, the first element 804 can comprise a series of 3-input XOR gates. The first element 804 can be configured to provide output to at least one flip flop or to receive output from at least one flip flop. The first element 804 can be configured to provide output to a combinational logic element.

In an aspect, the encrypted data can be encrypted using a private cryptographic key and the encrypted data can be decrypted by the third element 808 using a public cryptographic key. In a further aspect, the second element 806 can be configured as a random number generator. In an aspect, the random number generator can be a true random number generator.

The circuit 802 can further comprise at least one flip flop and a combinational logic element, wherein the first element can be configured to output to at least one of the combinational logical element and the at least one flip flop.

The first input can comprise a first number of bits and the second input can comprise the first number of bits, and wherein the first input and the second input can be expanded to provide input for a second number of XOR gates of the first element 804, and wherein the second number can be equal to an expansion coefficient multiplied by the first number.

In an aspect, illustrated in FIG. 9, provided are methods of verifying a circuit, comprising receiving a random number at 902, wherein the random number is generated by an integrated circuit, providing a first cryptographic key based on the random number at 904, receiving results of a test performed on the integrated circuit at 906, wherein the test is performed based on the first cryptographic key, and verifying integrity of the integrated circuit based on the results at 908. The methods can further comprise providing the integrated circuit based on the verifying the integrity of the integrated circuit.

In an aspect, the integrated circuit can comprise an XOR mask configured to receive a first output from a first element and a second output from a second element, and wherein the first element is a random number generator, and wherein the second element is configured to receive encrypted data, decrypt the encrypted data, and provide the decrypted data as the second output. The XOR mask can comprise a plurality of XOR gates wherein the verifying integrity of the integrated circuit based on the results comprises identifying at least one of the plurality of XOR gates that is configured as an inverter based on the first output and the second output.

In a further aspect, the integrated circuit can be configured to operate as a transparent buffer when the first output matches the second output and configured to operate as an inverter when the first output does not match the second output.

The methods can further comprise providing an instruction to discard the integrated circuit based on the verifying of the integrity of the integrated circuit.

The random number and the results can be received from a manufacturer of the integrated circuit, and wherein the first cryptographic key is provided to the manufacturer.

The methods can further comprise receiving a second random number, wherein the second number is generated by a packaged integrated circuit, and wherein the packaged integrated circuit comprises the integrated circuit after a die packaging operation is applied to the integrated circuit, providing a second cryptographic key, receiving test results of a test performed on the packaged integrated circuit, and verifying the integrity of the packaged integrated circuit based on the results of the test results of the test performed on the packaged integrated circuit.

In an aspect, illustrated in FIG. 10, provided are methods for manufacturing a circuit, comprising generating an integrated circuit at 1002, wherein the integrated circuit comprises a first element configured to receive a first input from a second element and a second input from a third element, and wherein the first element functions as an inverter if the first input does not match the second input, receiving a random number based on the first input at 1004, providing the random number to a remote computing device at 1006, receiving a first cryptographic key based on the random number from the remote computing device at 1008, testing the integrated circuit based on the first cryptographic key and the random number at 1010, and providing results of the testing of the circuit element to the remote computing device at 1012.

In an aspect, the first input can comprise a first number of bits and the second input can comprise the first number of bits, and wherein the first input and the second input can be expanded to provide input for a second number of XOR gates of the first element, and wherein the second number can be equal to an expansion coefficient multiplied by the first number.

In a further aspect, testing the circuit element can comprise providing the first cryptographic key to the third element and applying test patterns to the integrated circuit. In an aspect, the first element can comprise an XOR mask, and wherein the third element is configured to receive encrypted data, decrypt the encrypted data, and provided the decrypted data as the second input. The first element can be configured to operate as a transparent buffer when the first input matches the second input. The second element can be a random number generator, and wherein determining the random number based on the first input can comprise receiving the random number as the first output.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

REFERENCES

[1] "Defense Industrial Base Assessment: Counterfeit Electronics", http://www.bis.doc.gov/defenseindustrialbaseprograms/osies/defmarketresearchrpts/final_counterfeit_electronics_report.pdf, U.S. Department of Commerce Bureau of Industry and Security Office of Technology Evaluation, 2010.

[2] B. Jun and P. Kocher, "The Intel random number generator", Intel Corporation, 1999.

[3] "PCKS #1 v2.1: RSA Cryptography Standard", ftp://ftp.rsasecurity.com/pub/pkcs/pkcs-1/pkcs-1v2-1.pdf, RSA Security, 2002.

[4] B. Surtax, W. J. Martin, and D. R. Stinson, "A Provably Secure True Random Number Generator with Built-In Tolerance to Active Attacks", IEEE Transactions on Computers, vol. 56, num. 1, pp. 109-119, 2007.

[5] H. Livingston, "Avoiding Counterfeit Electronic Components", IEEE Transactions on Components and Packaging Technologies, vol. 30, num. 1, pp. 187-189, 2007.

[6] J. Stradley and D. Karraker, "The Electronic Part Supply Chain and Risks of Counterfeit Parts in Defense Applications", IEEE Transactions on Components and Packaging Technologies, vol. 29, num. 3, pp. 703-705, 2000.

[7] K. Chatterjee and D. Das, "Semiconductor Manufacturers' Efforts to Improve Trust in the Electronic Part Supply Chain", IEEE Transactions on Components and Packaging Technologies, vol. 30, num. 3, pp. 547-549, 2007.

[8] K. Lofstrom, W. R. Daasch, and D. Taylor, "IC identification using device mismatch", in proc. IEEE International Solid-State Circuits Conference (ISSCC), pp. 372-373, 2000.

[9] B. Gassend, D. Clarke, M. van Dijk, and S. Devadas, "Silicon physical random functions", in proc. 9th ACM Conference on Computer and Communicatios Security (CCS '02), pp. 148-160, 2002.

[10] G. E. Suh and S. Devadas, "Physical Unclonable Functions for Device Authentication and Secret Key Generation", in proc. 44th ACM/IEEE Design Automation Conference (DAC '07), pp. 9-14, 2007.

[11] J. Guajardo, S. S. Kumar, G.-J. Schrijen, and P. Tuyls, "FPGA Intrinsic PUFs and Their Use for IP Protection", in proc. 9th International Workshop on Cryptographic Hardware and Embedded Systems (CHES '07), pp. 63-80, 2007.

[12] S. S. Kumar, J. Guajardo, R. Maes, G. J. Schrijen, and P. Tuyls, "Extended Abstract: The Butterfly PUF Protecting IP on Every FPGA", in proc. IEEE International Workshop on Hardware-Oriented Security and Trust (HOST '08), pp. 67-70, 2008.

[13] F. Koushanfar and G. Qu, "Hardware Metering", in proc. Design Automation Conference 2001 (DAC '01), pp. 490-493, 2001.

[14] F. Koushanfar, G. Qu, and M. Potkonjak, "Intellectual Property Metering", in proc. 4th International Workshop on Information Hiding (IHW '01), pp. 81-95, 2001.

[15] Y. M. Alkabani and F. Koushanfar, "Active hardware metering for intellectual property protection and security", in proc. 16th USENIX Security Symposium, pp. 20:1-20:16, 2007.

[16] J. A. Roy, F. Koushanfar, and I. L. Markov, "EPIC: Ending Piracy of Integrated Circuits", in proc. Design, Automation and Test in Europe 2008 (DATE '08), pp. 1069-1074, 2008.

[17] R. L. Rivest, A. Shamir, and L. Adleman, "A method for obtaining digital signatures and public-key cryptosystems", Communications of the ACM, vol. 21, num. 2, pp. 120-126, 1978.

[18] Z. Keija, X. Ke, W. Yang, and M. Hao, "A novel ASIC implementation of RSA algorithm", in proc. 5th International Conference on ASIC (ICASIC '03), pp. 1300-1303, 2003.

[19] A. Baumgarten, A. Tyagi, and J. Zambreno, "Preventing IC Piracy Using Reconfigurable Logic Barriers", IEEE Design Test of Computers, vol. 27, num. 1, pp. 65-75, 2010.

[20] R. Datta, A. Sebastine, A. Raghunathan, and J. A. Abraham, "On-chip delay measurement for silicon debug", in proc. 14th ACM Great Lakes Symposium on VLSI (GLSVLSI '04), pp. 145-148, 2004.

[21] C. H. Kim, K. Roy, S. Hsu, R. K. Krishnamurthy, and S. Borkar, "On-die CMOS leakage current sensor for measuring process variation in sub-90 nm generations", in proc. 2004 Symposium on VLSI Circuits (VLSIC '04), pp. 250-251, 2004.

[22] B. Alorda, S. Bota, and J. Segura, "A non-intrusive built-in sensor for transient current testing of digital VLSI circuits", in proc. 11th IEEE International On-Line Testing Symposium (IOLTS '05), pp. 172-182, 2005.

[23] "Synopsys VCS", http://www.synopsys.com/Tools/Verification/Functional Verification/Pages/VCS.aspx, Synopsys, Inc., 2012.

[21] M. Bushnell and V. Agrawal, Essentials of Electronic Testing for Digital, Memory, and Mixed-signal VLSI Circuits, Kluwer Academic, 2000.

What is claimed is:

1. A circuit comprising:
a first element configured to receive a first input and a second input, wherein the first element is configured as a buffer when the first input matches the second input and configured as an inverter when the first input does not match the second input;
a second element coupled to the first element, wherein the second element is configured to provide a random number as the first input to the first element; and
a third element coupled to the first element, wherein the third element is configured to receive encrypted data, decrypt the encrypted data, and provide at least a portion of the decrypted data as the second input to the first element.

2. The circuit of claim 1, wherein the first element comprises a series of 3-input XOR gates.

3. The circuit of claim 1, wherein the first element is configured to provide output to at least one flip flop or to receive output from at least one flip flop.

4. The circuit of claim 1, wherein the first element is configured to provide output to a combinational logic element.

5. The circuit of claim 1, wherein the encrypted data is encrypted using a private cryptographic key and the encrypted data is decrypted by the third element using a public cryptographic key.

6. The circuit of claim 1, wherein the second element is configured as a random number generator.

7. The circuit of claim 1, wherein the first input comprises a first number of bits and the second input comprises the first number of bits, and wherein the first input and the second input are expanded to provide input for a second number of XOR gates of the first element, and wherein the second number is equal to an expansion coefficient multiplied by the first number.

8. A method of verifying a circuit, comprising:
receiving a random number, wherein the random number is generated by an integrated circuit;
providing a first cryptographic key based on the random number;
receiving results of a test performed on the integrated circuit, wherein the test is performed based on the first cryptographic key; and
verifying integrity of the integrated circuit based on the results.

9. The method of claim 8, wherein the integrated circuit comprises an XOR mask configured to receive a first output from a first element and a second output from a second element, and wherein the first element is a random number generator, and wherein the second element is configured to receive encrypted data, decrypt the encrypted data, and provide the decrypted data as the second output.

10. The method of claim 9, wherein the XOR mask comprises a plurality of XOR gates wherein the verifying integrity of the integrated circuit based on the results comprises identifying at least one of the plurality of XOR gates that is configured as an inverter based on the first output and the second output.

11. The method of claim 9, wherein the integrated circuit is configured to operate as a transparent buffer when the first output matches the second output and configured to operate as an inverter when the first output does not match the second output.

12. The method of claim 8, further comprising providing an instruction to discard the integrated circuit based on the verifying of the integrity of the integrated circuit.

13. The method of claim 8, wherein the random number and the results are received from a manufacturer of the integrated circuit, and wherein the first cryptographic key is provided to the manufacturer.

14. The method of claim 8, further comprising:
receiving a second random number, wherein the second number is generated by a packaged integrated circuit, and wherein the packaged integrated circuit comprises the integrated circuit after a die packaging operation is applied to the integrated circuit;
providing a second cryptographic key;
receiving test results of a test performed on the packaged integrated circuit; and
verifying the integrity of the packaged integrated circuit based on the results of the test results of the test performed on the packaged integrated circuit.

15. A method for manufacturing a circuit, comprising:
generating an integrated circuit, wherein the integrated circuit comprises a first element configured to receive a first input from a second element and a second input from a third element, and wherein the first element functions as an inverter if the first input does not match the second input;
receiving a random number based on the first input;
providing the random number to a remote computing device;
receiving a first cryptographic key based on the random number from the remote computing device;
testing the integrated circuit based on the first cryptographic key and the random number; and
providing results of the testing of the circuit element to the remote computing device.

16. The method of claim 15, wherein the first input comprises a first number of bits and the second input comprises the first number of bits, and wherein the first input and the second input are expanded to provide input for a second number of XOR gates of the first element, and wherein the second number is equal to an expansion coefficient multiplied by the first number.

17. The method of claim 15, wherein testing the circuit element comprises providing the first cryptographic key to the third element and applying test patterns to the integrated circuit.

18. The method of claim 15, wherein the second element is a random number generator, and wherein determining the random number based on the first input comprises receiving the random number as the first output.

19. The method of claim 15, wherein the first element comprise an XOR mask, and wherein the third element is configured to receive encrypted data, decrypt the encrypted data, and provided the decrypted data as the second input.

20. The method of claim 15, wherein the first element is configured to operate as a transparent buffer when the first input matches the second input.

* * * * *